(12) United States Patent
Zandbergen et al.

(10) Patent No.: US 11,801,741 B2
(45) Date of Patent: Oct. 31, 2023

(54) VEHICLE FRAME INCLUDING INTERNAL BATTERY COMPARTMENTS

(71) Applicant: Ford Global Technologies, LLC, Dearborn, MI (US)

(72) Inventors: Paul Zandbergen, Würselen (DE); Rainer Souschek, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 17/412,582

(22) Filed: Aug. 26, 2021

(65) Prior Publication Data
US 2023/0062143 A1    Mar. 2, 2023

(51) Int. Cl.
*B60K 1/04* (2019.01)
*B60L 50/60* (2019.01)

(52) U.S. Cl.
CPC .............. *B60K 1/04* (2013.01); *B60L 50/66* (2019.02); *B60K 2001/0438* (2013.01)

(58) Field of Classification Search
CPC .... B60K 1/04; B60K 2001/0438; B60L 50/66
See application file for complete search history.

(56) References Cited

U.S. PATENT DOCUMENTS

| 8,739,907 | B2 | 6/2014 | Storc et al. |
| 9,045,030 | B2 | 6/2015 | Rawlinson et al. |
| 9,108,497 | B2 * | 8/2015 | Harrison, III ............ B60K 1/04 |
| 9,461,284 | B2 | 10/2016 | Power et al. |
| 10,046,666 | B2 | 8/2018 | Wei et al. |
| 10,392,052 | B2 * | 8/2019 | Takahashi .............. B62D 21/15 |
| 2013/0206496 | A1 * | 8/2013 | Hashimoto ............ B62D 21/12 180/291 |
| 2017/0043727 | A1 * | 2/2017 | Jay ......................... B60R 9/065 |

(Continued)

FOREIGN PATENT DOCUMENTS

CN     107878565 A     4/2018
CN     108773262 A     11/2018

(Continued)

OTHER PUBLICATIONS

Tesla Battery Day Transcript excerpts, 2020, 5 pages.

(Continued)

*Primary Examiner* — Jason D Shanske
*Assistant Examiner* — James J Triggs
(74) *Attorney, Agent, or Firm* — Lorne Forsythe; Bejin Bieneman PLC

(57) ABSTRACT

An assembly includes a vehicle frame having a middle section, a front-section vehicle-forward of the middle section, and a rear section vehicle-rearward of the middle section. The middle section has frame rails spaced from each other and cross-beams extending from one frame rail toward the other frame rail. The frame rails each having a vehicle-forward end and a vehicle-rearward end. The assembly includes one or more electric-vehicle batteries. At least one of the batteries is in one of the cross-beams. The assembly includes two front nodes between and directly connected to the middle section and the front section and two rear nodes between and directly connected to the middle section and the rear section.

20 Claims, 7 Drawing Sheets

(56) References Cited

U.S. PATENT DOCUMENTS

2020/0168962 A1 5/2020 Schlunke et al.
2020/0358079 A1 11/2020 Hudak et al.

FOREIGN PATENT DOCUMENTS

| | | |
|---|---|---|
| DE | 102014219991 A1 | 4/2016 |
| DE | 102017103653 A1 | 8/2018 |
| DE | 102018010057 A1 | 6/2019 |
| FR | 2985690 A3 | 7/2013 |
| KR | 102107411 B1 | 5/2020 |
| TW | 201613786 A | 4/2016 |
| WO | 2012025710 A2 | 3/2012 |
| WO | 2012117204 A1 | 9/2012 |
| WO | 2018189675 A2 | 10/2018 |
| WO | 2019028511 A1 | 2/2019 |
| WO | 2019028515 A1 | 2/2019 |
| WO | 2019028516 A1 | 2/2019 |
| WO | 2019213717 A1 | 11/2019 |

OTHER PUBLICATIONS

Tesla 2020 Battery Day Transcript Sep. 22, www.rev.com, Sep. 22, 2020, 56 pages.
Ma, J., "Multifunctional Li-Ion Battery Structures, Actuators and Sensors," A Dissertation in Mechanical Engineering, Submitted in Partial Fulfillment of the Requirements for the Degree of Doctor of Philosophy, Aug. 2019, 105 pages.
Saracco, R., "Towards Structural Batteries," IEEE Future Directions, Nov. 10, 2020, 2 pages.
Oberhaus, D., "The Batteries of the Future are Weightless and Invisible," www.wired.com, Nov. 6, 2020, 6 pages.
Clemens, K., "Making Structural Batteries Robust," www.designnews.com, Jan. 18, 2019.
"CBT Structural Battery, Driving the Future of the Electric Car," Cape Boulevard Technologies, Apr. 12, 2021, 3 pages.
"CBT Commences Battery Manufacture," Cape Boulevard Technologies, Apr. 12, 2021, 3 pages.
Walsh, D., "Magna to build $70M EV battery component plant in Mich." Automotive News, Feb. 23, 2021, 10 pages.
"News Release—Magna's New Michigan Plant to Support Fast-Growing Electric Vehicle Market," www.magna.com, Feb. 12, 2021, 4 pages.
"China's CATL aims to make EVs drive further with new tech," www.autoblog.com, Apr. 12, 2021, 4 pages.
Marques, J., "Will Renault One Up Tesla's Structural Batteries," www.thenextavenue.com, Oct. 19, 2020, 4 pages.
Kane, M., "Tesla: Significant Range Increase (30%) Possible Without New Chemistry," INSIDEEVS, Sep. 23, 2020, 3 pages.
Kane, M., "Elon Musk: Tesla Model S Plaid to Have Structural Battery, 4680 Cells," INSIDEEVS, Oct. 2, 2020, 3 pages.
"Musk says Tesla to use new batteries, tech at Berlin factory; flags production risk," Reuters, Oct. 7, 2020, 3 pages.
Alvarez, S., "Tesla will retire the iconic skateboard it pioneered in favor of the structural battery packs," www.teslarati.com, Oct. 22, 2020, 15 pages.
Lambert, F., "First look at Tesla's new structural battery pack that will power its future electric cars," electrek, Jan. 19, 2021, 17 pages.
Perkins, C., "Future Tesla Cars Will Use Batteries for Shell Structure," www.roadandtrack.com, Sep. 22, 2020, 6 pages.
"Carbon fibre can store energy in the body of a vehicle," www.chalmers.se, Apr. 12, 2021, 4 pages.
Ashley, S., "Batteries that can Multitask," New York Times, Jun. 3, 2011, 2 pages.
Hurst, N., "Let's Build Cars out of Batteries," www.smithsonianmag.com, Nov. 2, 2018, 3 pages.
"Press Release—Volvo Car Group makes conventional batteries a thing of the past," www.media.volvocars.com, Oct. 17, 2013, 6 pages.

* cited by examiner

VEHICLE FRAME INCLUDING INTERNAL BATTERY COMPARTMENTS

BACKGROUND

An electric vehicle includes an electric-vehicle battery that powers the vehicle, including propulsion of the vehicle. For example, wheels of the vehicle are powered by one or more electric motors that are powered by the electric-vehicle battery. Examples of electric vehicles include a battery-electric vehicle (BEV), a hybrid-electric vehicle (HEV), a plug-in hybrid electric vehicles (PHEV), etc.

DETAILED DESCRIPTION

Figure 1:
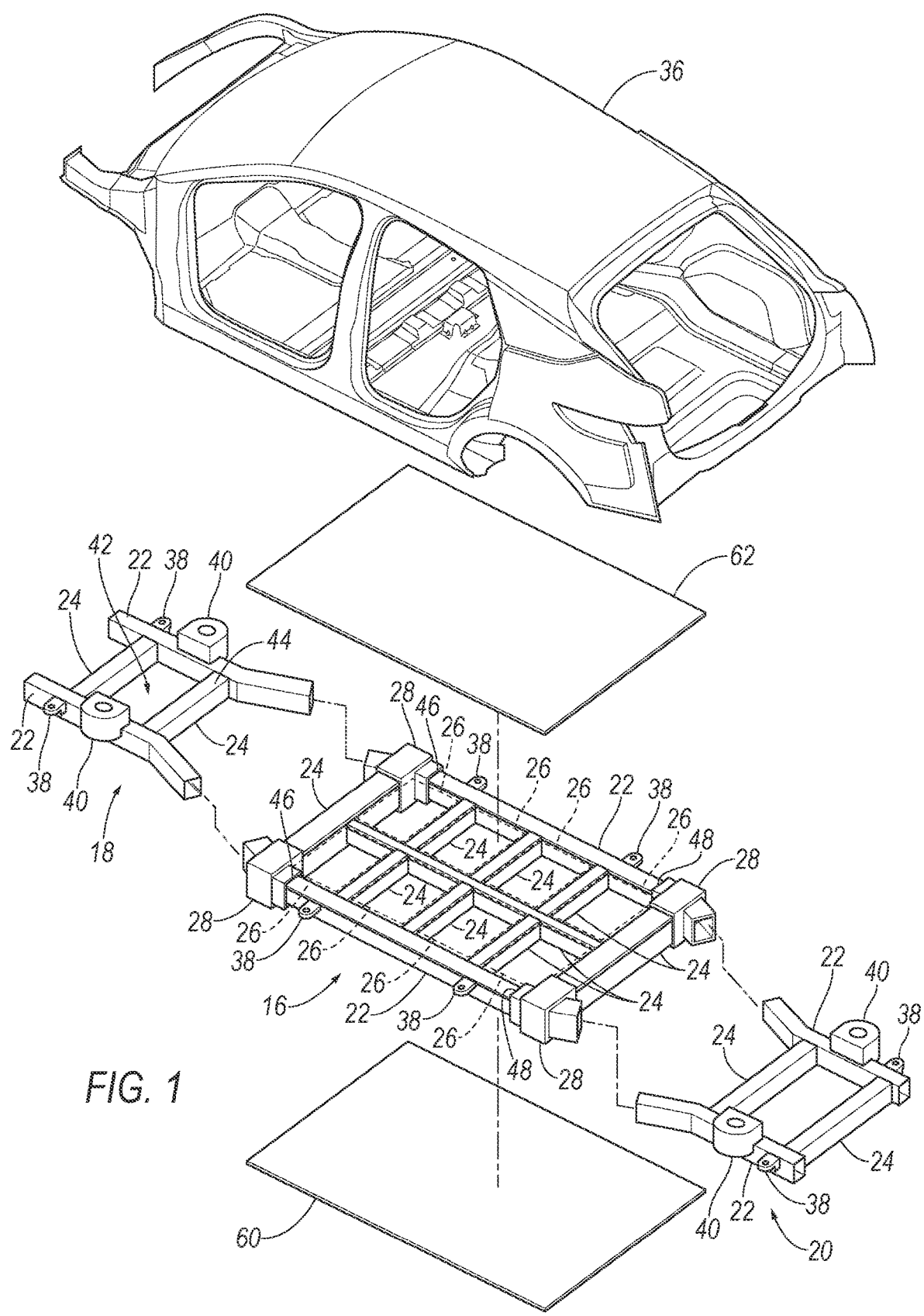
FIG. 1 is an exploded view of a vehicle body and a vehicle frame.

An assembly includes a vehicle frame having a middle section, a front-section vehicle-forward of the middle section, and a rear section vehicle-rearward of the middle section. The middle section has frame rails spaced from each other and cross-beams extending from one frame rail to the other frame rail. The assembly includes one or more electric-vehicle batteries. At least one of the electric-vehicle batteries is in one of the cross-beams. The assembly includes two front nodes between and directly connected to the middle section and the front section and two rear nodes between and directly connected to the middle section and the rear section.

At least one of the electric-vehicle batteries may be in one of the frame rails.

The cross-beams may define an internal battery compartment and one of the frame rails may define an internal battery compartment open to the internal battery compartment of the cross-beams. At least one of the electric-vehicle batteries is in the internal battery compartments of the cross-beams and the frame rail.

Each of a plurality of the cross-beams may have a base and a cover. The base may have a U-shaped cross-section defining an internal battery compartment and the cover may be connected to the base enclosing the internal battery compartment. At least one of the electric-vehicle batteries may be in the internal battery compartments of the cross-beams. The internal battery compartments may be elongated cross-vehicle. The base of the frame rail may have a U-shaped cross-section defining an internal battery compartment and the cover of the frame rail may be connected to the base of the frame rail enclosing the internal battery compartment of the frame rail. At least some of the internal battery compartments of the cross-beams may be open to the internal battery compartment of the frame rail. The internal battery compartments of the cross-beams may be elongated cross-vehicle and the internal battery compartment of the frame rail may be elongated along a vehicle-longitudinal axis.

The front nodes may each include a hub joined to the middle section and front section and the rear nodes may each include a hub joined to the middle section and the rear section. The front nodes may each include a hollow arm extending from the hub of the front node and receiving and joined to the front section, and the rear nodes each may include a hollow arm extending from the hub of the rear node and receiving and joined to the rear section. The front nodes may each include a hollow arm extending from the hub of the front node and receiving and joined to the middle section, and the rear nodes may each include a hollow arm extending from the hub of the rear node and receiving and joined to the middle section.

One of the cross-beams may extend from one of the front nodes to the other of the front nodes and another of the cross-beams may extend from one of the rear nodes to the other of the rear nodes.

The front nodes may be on vehicle-forwardmost ends of the frame rails and the rear nodes are on vehicle-rearwardmost ends of the frame rails.

The vehicle frame may have a body-on-frame construction.

The front nodes may be welded to the middle section and the front section and the rear nodes may be welded to the middle section and the rear section.

The front nodes may be fastened to the middle section and the front section and the rear nodes may be fastened to the middle section and the rear section.

The cross-beams and the frame rails may define battery compartments therebetween, at least one of the batteries being in one of the battery compartments.

The assembly may include a vehicle powertrain and vehicle suspension and steering components mounted to the vehicle frame.

The assembly may include a vehicle body supported on and mounted to the vehicle frame.

With reference to the figures, wherein like numerals indicate like parts throughout the several views, an assembly 10 for an electric vehicle 12 is generally shown. The assembly 10 includes a vehicle frame 14 having a middle section 16, a front section 18 vehicle-forward of the middle section 16, and a rear section 20 vehicle-rearward of the middle section 16. The middle section 16 has a pair of frame rails 22 spaced from each other. The middle section 16 has cross-beams 24 extending from the first frame rail 22 to the second frame rail 22. The assembly 10 includes one or more electric-vehicle batteries 26. At least one of the electric-vehicle batteries 26 is in one of the cross-beams 24, i.e., the electric-vehicle batteries 26 are in the vehicle frame 14. The assembly 10 includes two front nodes 28 between and directly connected to the middle section 16 and the front section 18 and two rear nodes 30 between and directly connected to the middle section 16 and the rear section 20.

The disposition of at least one of the electric-vehicle batteries 26 in the middle section 16 of the vehicle frame 14, e.g., in the cross-beam 24 of the middle section 16, reduces packaging constraints to increase the effective battery compartment size of the middle section 16 and may reduce some other reinforcement components used for reinforcing battery trays, battery compartments, etc., that are external to the vehicle frame 14. Since the nodes 28, 30 join the front section 18 and the rear section 20 to the middle section 16, the front section 18 and/or the rear section 20 may be removed from the middle section 16. Accordingly, in the event the front section 18 or the rear section 20 is damaged or otherwise needs replacement, the front section 18 or rear section 20 may be detached from the middle section 16 at the node 28, 30, as described further below. This allows for the one or more electric-vehicle batteries 26 in the cross-beam 24 to remain with the rest of the electric vehicle 12 while a section 18, 20 of the vehicle frame 14 is replaced. The nodes 28, 30 also allow for interchangeable assembly of different types of front sections 18 and/or rear sections 20 during assembly of the electric vehicle 12. For example, the various types of front sections 18 include common interfaces that can fit with the front nodes 28 and various types of rear sections 20 may include common interfaces that fit with the rear nodes 30 to allow selection of any of front sections 18 and rear sections 20 for assembly to the middle section 16. This allows for the middle section 16 to be used with multiple vehicle models and/or trim levels.

Figure 3:
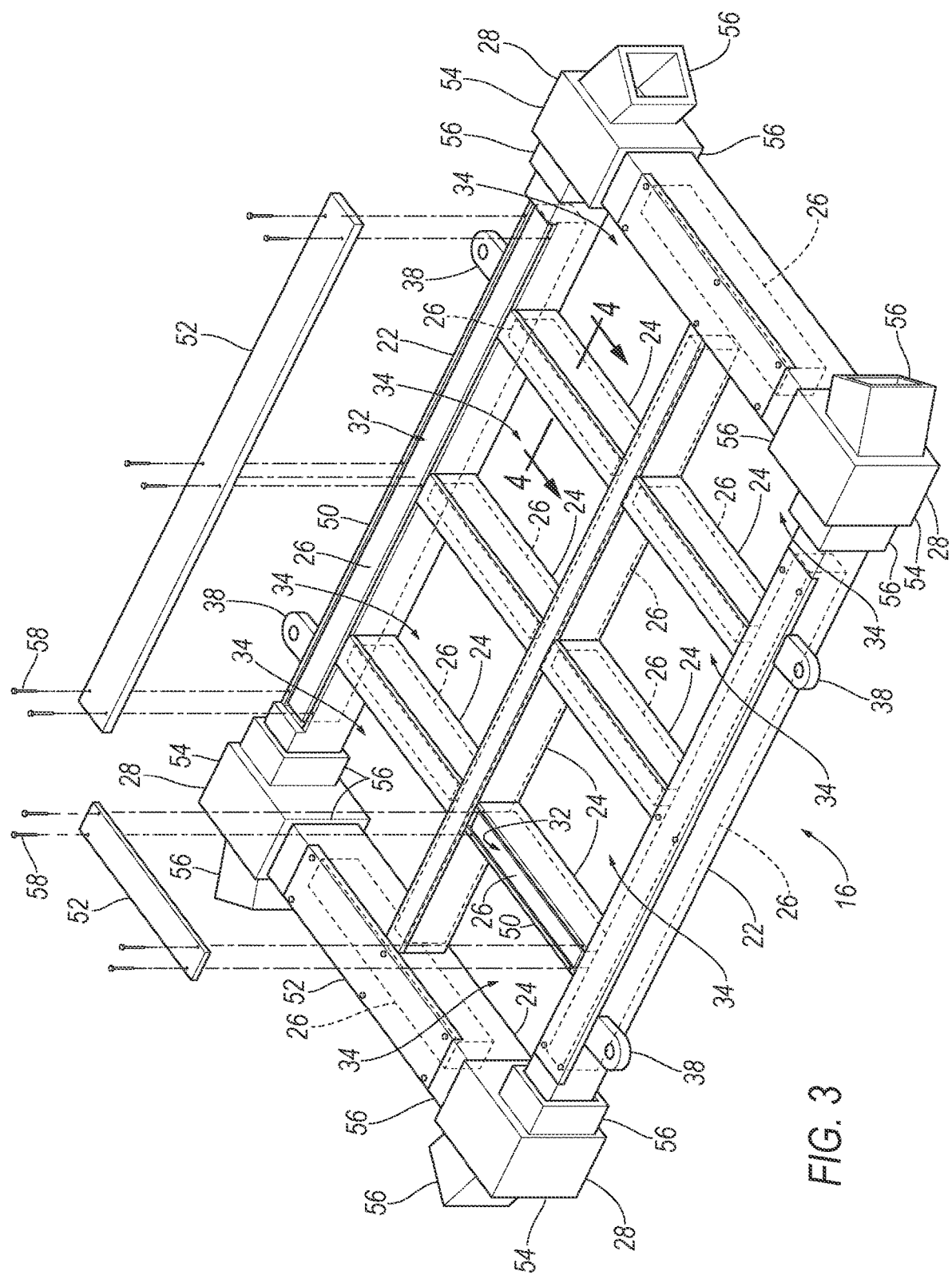
FIG. 3 is a perspective view of a middle section of the vehicle frame with covers of a frame rail and a cross-beam exploded to show internal battery compartments.
Figure 4:
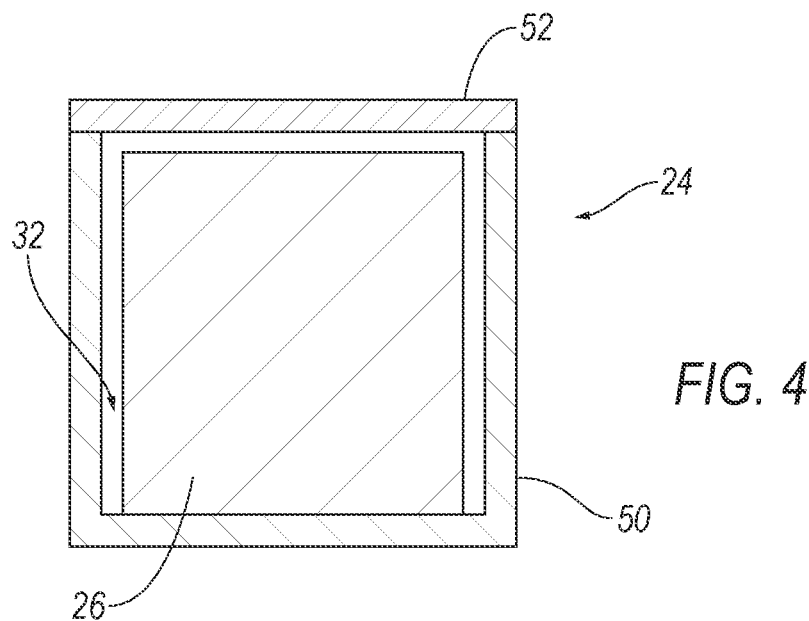
FIG. 4 is a schematic of a cross section of one of the cross-beams shown in FIG. 4.
Figure 5:
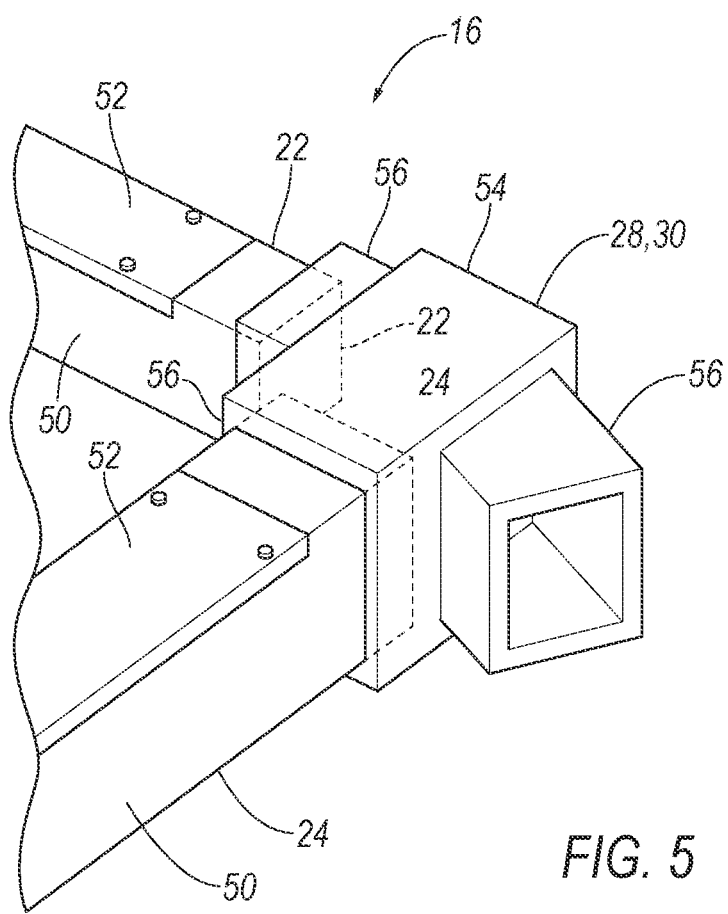
FIG. 5 is a perspective view of a portion of the middle section of the vehicle frame with a node having a hub and hollow arms extending from the hub.

As set forth further below, more than one of the cross-beams 24 may house one or more of the electric-vehicle batteries 26 in the cross-beam 24. As also set forth further below, one or both of the frame rails 22 may house one or more of the electric-vehicle batteries 26 in the frame rail 22. In the example shown in the figures, electric-vehicle batteries 26 are in both of the frame rails 22, four lateral cross-beams 24, and one longitudinal cross-beam 24. In other examples, the electric-vehicle batteries 26 may be in any combination of cross-beams 24 and/or frame rails 22. The cross-beams 24 and/or frame rails 22 define battery compartments, respectively, i.e., internal battery compartments 32, that house the electric-vehicle batteries 26 in the cross-beams 24 and/or frame rails 22 (as shown in FIGS. 3, 4, 7, and 8). In some examples, the frame rails 22 and the cross-beams 24 may define external battery compartments 34 housing electric-vehicle batteries 26 between the frame rails 22 and the cross-beams 24 external to the frame rails 22 and the cross-beams 24 (as shown in FIGS. 3 and 8). In such examples, including electric-vehicle batteries 26 both in the cross-beams 24 and/or frame rails 22 and between the frame rails 22 and the cross-beams 24 external to the frame rails 22 and cross-beams 24 increases the effective battery compartment size of the middle section 16.

The electric vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The electric vehicle 12, for example, may be an autonomous vehicle. In other words, the electric vehicle 12 may be autonomously operated such that the electric vehicle 12 may be driven without constant attention from a driver, i.e., the electric vehicle 12 may be self-driving without human input.

As set forth above, the electric vehicle 12 includes one or more electric-vehicle batteries 26. In the example shown in the figures, the electric vehicle 12 includes a plurality of electric-vehicle batteries 26 and, in such examples, the electric-vehicle batteries 26, in combination, power the electric vehicle 12. The electric-vehicle batteries 26 of the electric vehicle 12 powers propulsion of the electric vehicle 12, e.g., powers one or more drivetrain motor that propels the vehicle on a driving surface. Examples of electric vehicles include a battery-electric vehicle (BEV), a hybrid-electric vehicle (HEV), a plug-in hybrid electric vehicles (PHEV), etc.

The electric-vehicle battery 26 may be of any suitable type for vehicular electrification, for example, lithium-ion batteries, nickel-metal hydride batteries, lead-acid batteries, ultracapacitors, etc. The electric-vehicle battery 26 may include at least one battery module. Each battery module may include one or more battery cells. The electric-vehicle battery 26 may include any suitable hardware, e.g., wiring, connectors, circuits, etc., connecting the battery modules to each other and to electrified components of the electric vehicle 12. Specifically, the electric-vehicle battery 26 may include a plurality of battery cells that are pouch cells. The pouch cells have a flexible outer bag and electrodes, e.g., conductive foil tabs, that extend through the flexible outer bag. In such an example, the battery cells are stacked together, e.g., arranged consecutively. In such an example, the pouch cells may be stacked in the internal battery compartments 32. Specifically, the pouch cells may be stacked in the internal battery compartment 32 without a battery case housing the pouch cells in the internal battery compartment 32. In other words, the pouch cells abut internal walls of the cross-beams 24 and/or frame rails 22 that define the internal battery compartment 32. In other examples, the electric-vehicle battery 26 may include a battery case housing the pouch cells and providing structural support for the pouch cells and, in such examples, the battery case is housed in the internal battery compartment 32. The battery cells may be, for example, lithium based.

The electric vehicle 12 has a body-on-frame architecture (also referred to as a cab-on-frame construction). Specifically, the electric vehicle 12 includes a vehicle body 36 mounted to the vehicle frame 14. The vehicle body 36 and the vehicle frame 14 are separate components, i.e., are modular, and the vehicle body 36 is supported on and affixed to the vehicle frame 14. During assembly of the vehicle, the vehicle frame 14 is assembled and the vehicle body 36 is subsequently set on and attached to the vehicle frame 14. The vehicle frame 14 and vehicle body 36 may be of any suitable material, for example, steel, aluminum, and/or fiber-reinforced plastic, etc.

The vehicle body 36 includes body panels (not numbered). The body panels may include structural panels, e.g., rockers, pillars (e.g., A-pillars, B-pillars, C-pillars), roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle body 36 may define a passenger cabin to house occupants, if any, of the vehicle.

The vehicle frame 14 has a body-on-frame construction. Specifically, the vehicle frame 14 may include cab mount brackets 38 on which the vehicle body 36 rests and is affixed. The cab mount brackets 38 may be on the middle section 16, front section 18, and/or rear section 20 of the vehicle frame 14. In the example shown in the figures, cab mount brackets 38 are on each the middle section 16, front section 18, and rear section 20. The cab mount brackets 38 are fixed to the vehicle frame 14, e.g., welded to the vehicle frame 14. Specifically, the cab mount brackets 38 may be fixed the frame rail 22 of the vehicle frame 14 and may extend outboard from the rail. The cab mount bracket 38 may be cantilevered from the frame rail 22. The cab mount brackets 38 are configured to support the vehicle body 36 in a body-on-frame configuration. For example, the cab mount bracket 38 may include a post or a hole that receives a hole or a post, respectively, of the vehicle body 36 to connect the vehicle body 36 to the vehicle frame 14. Specifically, the vehicle body 36 may be fixed to the cab mount bracket 38. During assembly of the vehicle, the vehicle body 36 is set on the vehicle frame 14 with fastening features of the vehicle body 36 aligned with the cab mount brackets 38 for engagement with the cab mount brackets 38.

The vehicle frame 14 may include suspension and steering attachment points that support suspension and steering components of the vehicle. As one example, the suspension and steering attachment points may be suspension towers 40. The suspension towers 40 may be fixed to the front section 18, middle section 16, or rear section 20. In the example shown in the figures, the suspension towers 40 are fixed to the front section 18 and the rear section 20. In such an example, since the suspension towers 40 are on the front section 18 and the rear section 20, the middle section 16 may be assembled with varying designs of front sections 18 and rear sections 20, e.g., having different locations, designs, etc., of the suspension tower 40 for different vehicle models and trim levels. The suspension and steering components of the vehicle are connected to the vehicle frame 14, at least in part, at the suspension towers 40. The suspension and steering components include suspension shocks, suspension struts, steering arms, steering knuckles, vehicle wheels, etc.

The front section 18 and/or the rear section 20 of the vehicle frame 14 may have a powertrain compartment 42 designed to support and house a vehicle powertrain. Specifically, the front section 18 and the rear section 20 include frame rails 22 and cross-beams 24. At least one of the cross-beams 24 may be a powertrain cradle 44, i.e., a cross-beam 24 designed to support and affix to the vehicle powertrain. The powertrain cradle 44 may define a boundary of the powertrain compartment 42, e.g., a lower boundary of the powertrain compartment 42. The vehicle powertrain in the powertrain compartment 42 may be, for example, an internal combustion engine, a transmission, and/or powertrain-electrification components. Powertrain-electrification components deliver, manage, store, and/or control electrical power. In examples in which the powertrain components are supported by the powertrain cradle 44, the powertrain components may be directly connected to the powertrain cradle 44 and/or the weight of at least some of the powertrain components may be borne by the powertrain cradle 44. In some examples, the weight of one of the powertrain components may be on top of the powertrain cradle 44 and in other examples the powertrain component may be suspended from the powertrain cradle 44 below the powertrain cradle 44.

Since the vehicle frame 14 includes the battery compartments 32, 34, powertrain cradle 44, and suspension and steering attachment points, a portion of the vehicle may be assembled and self-propelled prior to assembly of the vehicle body 36 to the vehicle frame 14. Specifically, a powertrain may be supported by the powertrain cradle 44 of the vehicle frame 14, suspension and steering components may be assembled to the suspension and steering attachment points, and electric-vehicle batteries 26 may be assembled to the vehicle frame 14, e.g., in the internal battery compartments 32. Such an assembly may be self-propelled by electrifying the powertrain with the electric-vehicle batteries 26 and steering with the steering components. Accordingly, such an assembly may be moved during the vehicle assembly process by self-propulsion. During the vehicle assembly process, the vehicle body 36 may be assembled to the vehicle frame 14 as described above.

The vehicle frame 14 may be elongated along a vehicle-longitudinal axis L. As set forth above, the front-section is vehicle-forward of the middle section 16 and the rear section 20 is vehicle-rearward of the middle section 16. "Vehicle-forward" is the primary direction of travel of the vehicle and "vehicle-rearward" is the opposite direction. Vehicle-forward and vehicle-rearward are directions along the vehicle-longitudinal axis.

Each of the middle section 16, the front section 18, and the rear section 20 of the vehicle frame 14 include frame rails 22. The middle section 16 of the vehicle frame 14 includes cross-beams 24 and the front section 18 and/or rear section 20 may include cross-beams 24. The frame rails 22 of middle section 16, the front section 18, and the rear section 20 are spaced from each other along a cross-vehicle axis C. The cross-vehicle axis C may be perpendicular to the vehicle-longitudinal axis L.

The frame rails 22 of the middle section 16, the front section 18, and the rear section 20 are elongated along the vehicle-longitudinal axis. Specifically, the frame rails 22 each have a vehicle-forwardmost end 46 and a vehicle-rearwardmost end 48 and the frame rails 22 may be straight or not straight between the vehicle-forwardmost end 46 and the vehicle-rearwardmost end 48, but in any event, are elongated along the vehicle-longitudinal axis from the vehicle-forwardmost end 46 and the vehicle-rearwardmost end 48, as shown in the example in the figures. For each of the middle section 16, front section 18, and rear section 20, the frame rails 22 may be outboard of all of the cross-beams 24. Said differently, all of cross-beams 24 may be between the two frame rails 22.

The cross-beams 24 are supported by the frame rails 22. At least some of the cross-beams 24 are connected directly to the frame rails 22, e.g., by welding.

At least some of the cross-beams 24 are elongated along the cross-vehicle axis C. One or more of the cross-beams 24 may be elongated transverse to the cross-vehicle axis C. For example, one of the cross-beams 24 of the middle section 16 is elongated along the longitudinal axis L in the example shown in the figures.

The cross-beams 24 extend from one frame rail 22 to the other frame rail 22, i.e., one frame rail 22 or a combination of frame rails 22 extend from one from rail to the other frame rail 22. In the example shown in the figures, the front section 18 and rear section 20 each include two cross-beams 24 extending from one frame rail 22 to the other frame rail 22. The middle section 16 in the example shown in the figures includes cross-beams 24 in combination extending from one frame rail 22 to the other frame rail 22. Specifically, in the example shown in the figures, pairs of cross-beams 24 are aligned with each other along the vehicle-longitudinal axis with each of the pair of cross-beams 24 extending from one of frame rails 22 toward each other to a longitudinally-elongated cross-beam 24 therebetween. In examples including cross-beams 24 that intersect other cross-beams 24, as shown in the example in the figures, the intersecting cross-beams 24 are fixed to each other, e.g., by welding.

The frame rails 22 and cross-beams 24 may be extruded, roll-formed, etc. The frame rails 22 and cross-beams 24 may be of any suitable material, e.g., suitable types of steel, aluminum, and/or fiber-reinforced plastic, etc. The frame rails 22 and cross-beams 24 may be hollow. The frame rails 22 and cross-beams 24 may be rectangular in cross-section (e.g., a hollow rectangular cuboid), round in cross section, e.g., a hollow, round such as a hollow cylinder), etc. The wall thickness of the frame rails 22 and the cross-beams 24 may be generally constant in examples in which the frame rails 22 and the cross-beams 24 are hollow.

As set forth above, one or more electric-vehicle batteries 26 are in the cross-beams 24 of the middle section 16 and, in some examples, in the frame rails 22 of the middle section 16. Specifically, the cross-beams 24 and the frame rails 22 have internal battery compartments 32. In examples in which the frame rails 22 and cross-beams 24 are hollow from end to end, the hollow portions may define the internal battery compartments 32. In such examples, the internal battery compartments 32 may be open to each other. In other examples, the internal battery compartments 32 may be smaller than the length of the frame rails 22 and cross-beams 24 and the frame rails 22 and cross-beams 24 may have varying wall thickness.

The internal battery compartments 32 may be elongated. Specifically, the internal battery compartments 32 may be elongated along the longest dimension of the cross-beam 24/frame rail 22. For example, at least some of the cross-beams 24 are elongated along the cross-vehicle axis C and, in such examples, the internal battery compartments 32 may be elongated along the cross-vehicle axis C. As another example, the frame rails 22 are elongated along the longitudinal axis L and, in such examples, the internal battery compartments 32 may be elongated along the longitudinal axis L.

The electric-vehicle batteries 26 are disposed in the internal battery compartments 32. The electric-vehicle batteries 26 may be enclosed in the internal battery compartments 32, i.e., without extending out of the battery compartment other than electrical connections. Specifically, one or more electric-vehicle batteries 26 may be enclosed in one of the internal battery compartments 32. As another example, in examples in which internal battery compartments 32 of adjacent cross-beams 24 and frame rails 22 are open to each other, one or more electric-vehicle batteries 26 may extend from one internal battery compartment 32 to an adjacent internal battery compartment 32.

The cross-beams 24 and frame rails 22 that define internal battery compartments 32 may each have a base 50 and a cover 52. In such an example, the base 50 has a U-shaped cross-section defining a battery compartment and the cover 52 is connected to the base 50 enclosing the battery compartment. As an example, the cover 52 may be removeably connected to the base 50 for access to the electric-vehicle battery 26 for service and/or replacement. In such an example, the cover 52 may be connected to the base 50 with removeable fasteners 58, e.g. threaded fasteners. The cover 52 may be on top of the base 50, on a side of the base 50, or under the base 50 when the vehicle is in operation. In examples in which the cover 52 is on the side of the base 50, the side is a wall of the base 50 that has a vertical component from the top to the bottom of the base 50. The side may be elongated vertically, for example.

Figure 7:
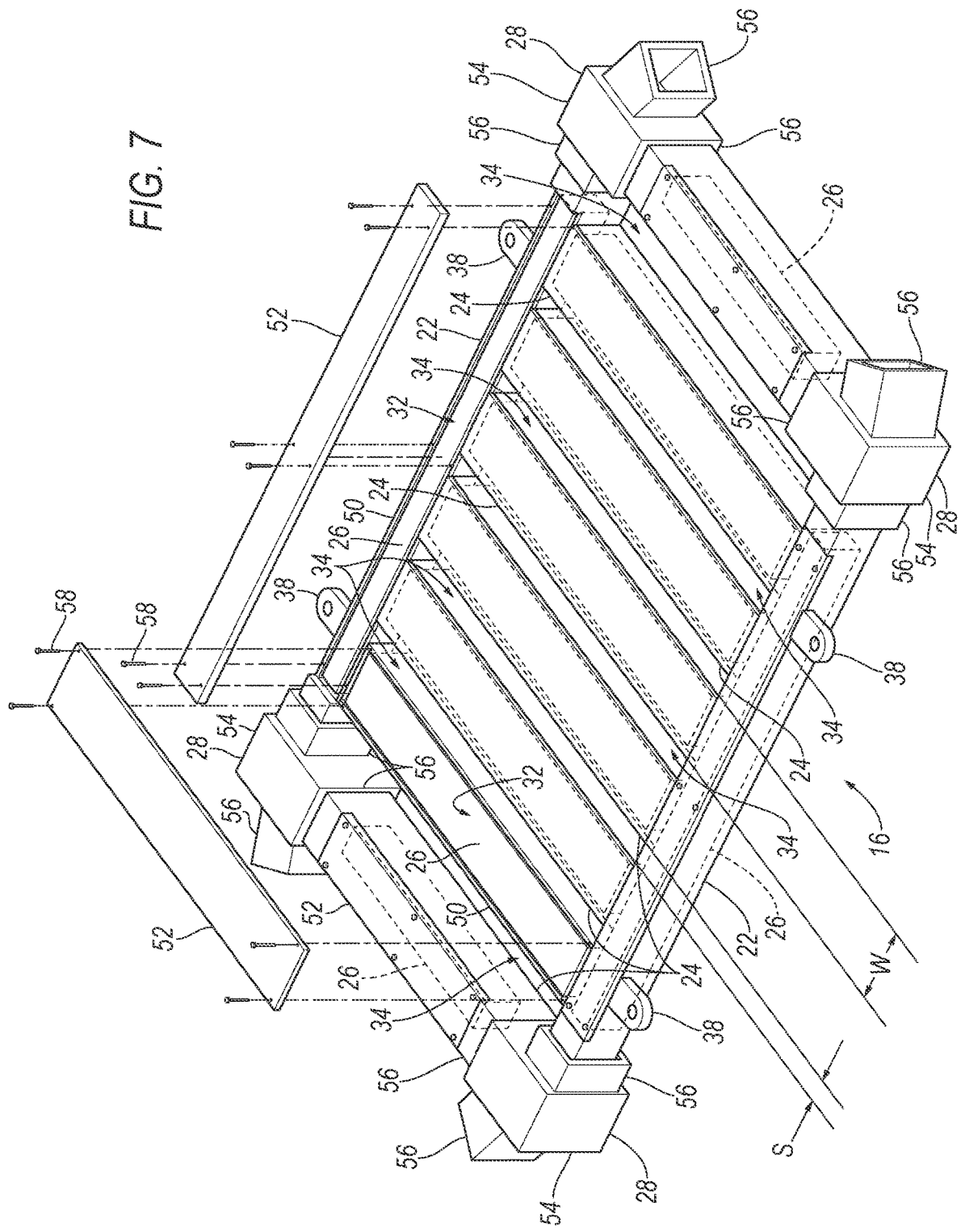
FIG. 7 is a perspective view of another example of the middle section.
Figure 8:
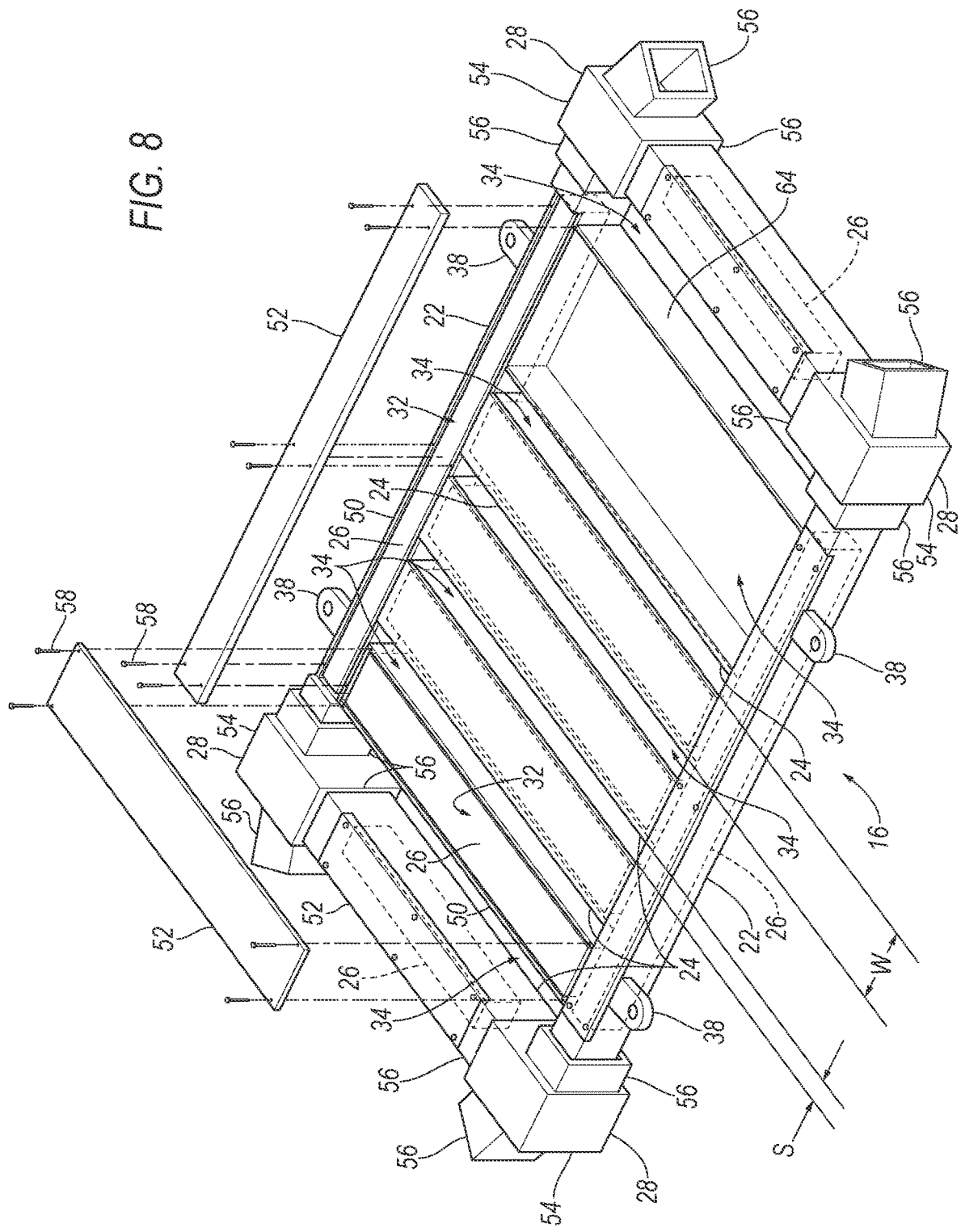
FIG. 8 is a perspective view of another example of the middle section.

One example of the cross-beams 24 is shown in FIG. 3, another example of the cross-beams 24 is shown in FIG. 7, and another example of the cross-beams 24 are shown in FIG. 8. The cross-beams 24 may have any suitable dimensions. In the example shown in FIG. 3, the cross-beams 24 are sized to have several external battery compartments 34 between the cross-beams 24. In the example shown in FIG. 7, the cross-beams have a vehicle-longitudinal width W and are spaced from each other by a vehicle-longitudinal space S. The vehicle-longitudinal space S is smaller than the vehicle-longitudinal width W. This maximizes the size of the internal battery compartment 32. In the example shown in FIG. 8, four cross-beams 24 are closely spaced to each other, i.e., with the vehicle-longitudinal space S smaller than the vehicle-longitudinal W, and an external battery compartment 34 is relatively large and supports a large battery array 64 for extended range travel of the electric vehicle 12.

The two front nodes 28 are between the middle section 16 and the front section 18 and the two rear nodes 30 are between the middle section 16 and the rear section 20. The front nodes 28 are on the vehicle-forwardmost ends 46 of the frame rails 22 and the rear nodes 30 are on the vehicle-rearwardmost ends 48 of the frame rails 22. One of the cross-beams 24 of the middle section 16 may extend one of the front nodes 28 to the other of the front nodes 28 and another of the cross-beams 24 of the middle section 16 may extend from one of the rear nodes 30 to the other of the rear nodes 30.

The two front nodes 28 are directly connected to the middle section 16 and the front section 18 and the two rear nodes 30 are directly connected to the middle section 16 and the rear section 20. The nodes 28, 30 are designed to allow the front section 18 and the rear section 20 to be removed from the middle section 16. As set forth above, this allows for replacement of the front section 18 or rear section 20 if damaged, e.g., in a vehicle impact. This allows for the electric-vehicle batteries 26 in the cross-beam 24 to remain with the rest of the electric vehicle 12 while a section of the vehicle frame 14 is replaced.

As an example, the front nodes 28 may each include a hub 54 joined to the middle section 16 and front section 18 and the rear nodes 30 may each include a hub 54 joined to the middle section 16 and the rear section 20. In such an example, the nodes 28, 30 may include hollow arms 56 extending from the hub 54 and each receiving one of the frame rails 22. For example, the front nodes 28 may each include a hollow arm 56 extending from the hub 54 of the front node 28 and receiving and joined to the frame rail 22 of the front section 18 and a hollow arm 56 extending from the hub 54 of the front node 28 and receiving and joined to the frame rail 22 of the middle section 16. Similarly, the rear nodes 30 may each include a hollow arm 56 extending from the hub 54 of the rear node 30 and receiving and joined to the frame rail 22 of the rear section 20 and a hollow arm 56 extending from the hub 54 of the rear node 30 and receiving and joined to the frame rail 22 of the middle section 16. In such an example, the nodes 28, 30 are designed to be removed from the middle section 16 by, for example, destruction of the hub 54 by cutting, torching, etc. In addition or in the alternative, the hollow sleeve and/or the joint between the hollow sleeve and the frame rail 22 may be destroyed by cutting, torching, etc., to release the front section 18/rear section 20 from the middle section 16. Destruction of the node 28, 30 releases the front section 18/rear section 20 from the middle section 16 for replacement of the front section 18/middle section 16. In one example, the hub 54 may be a solid block. In such an example, the solid block may be destructed by a service technician for release of the node 28, 30 from the section 16, 28, 30. In another example, the hub 54 may be hollow, i.e., may include a cavity open to the hollow arms 56. In such an example, the wall of the hub 54 may be destructed by a service technician for release of the node 28, 30 from the section 16, 28, 30.

Figure 2:
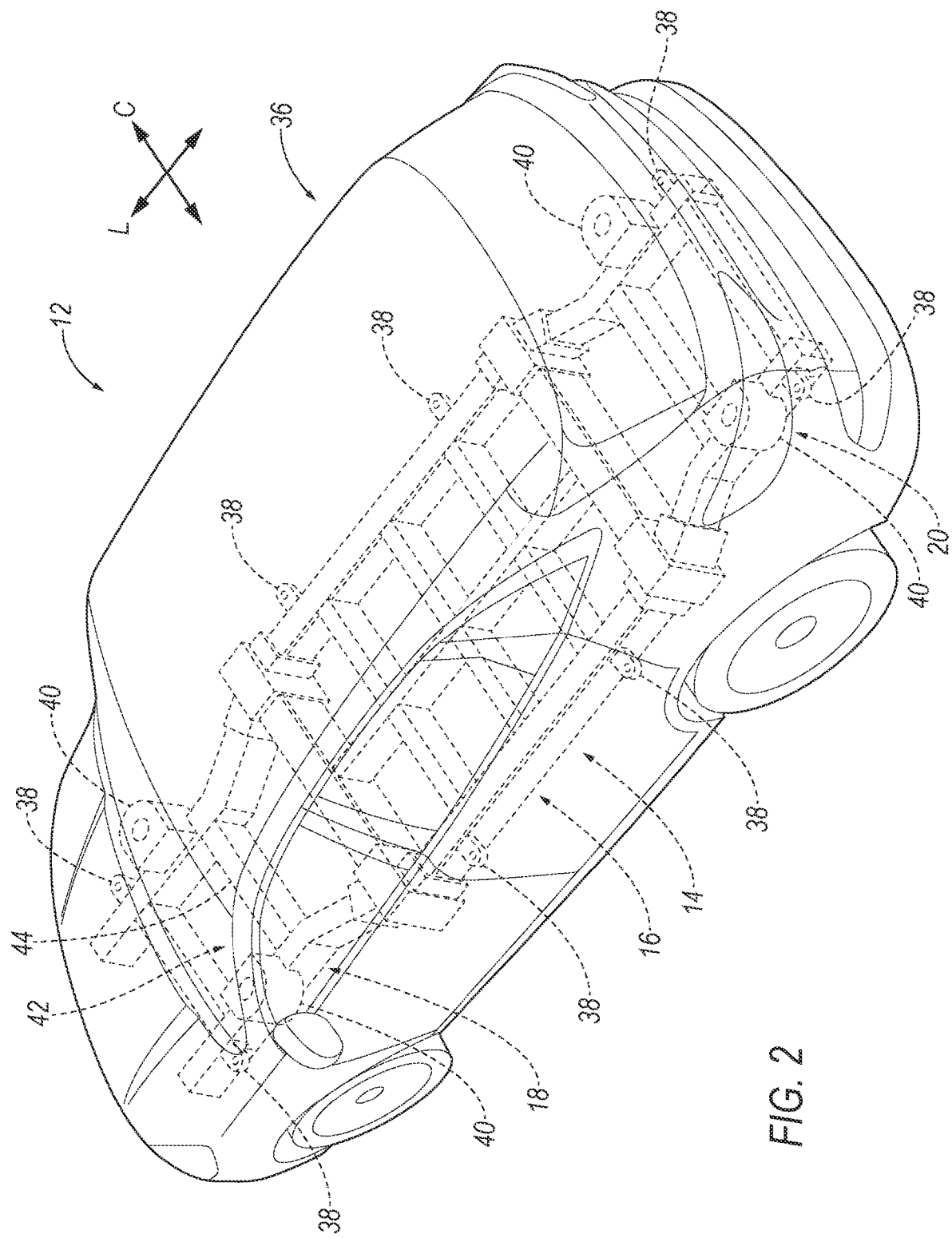
FIG. 2 is a perspective view of the vehicle with the vehicle frame shown in broken lines.
Figure 6:
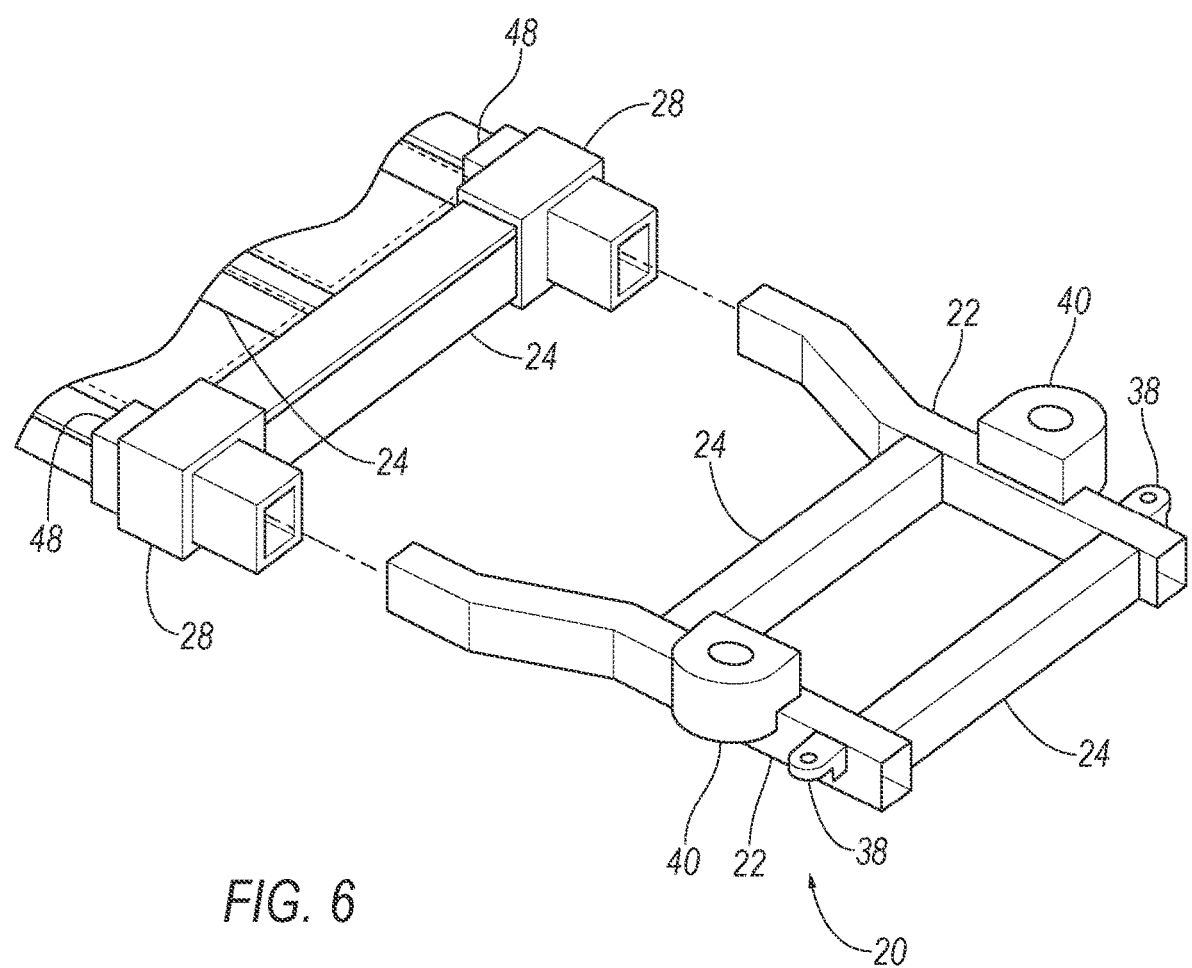
FIG. 6 is another example of a portion of the vehicle frame.

Some of the hollow arms 56 may intersect the hub 54 at right angles and/or some of the hollow arms 56 may intersect the hub 54 at a non-right angle. In other words, the hollow arm 56 has an axis and the axis intersects the hub 54 at a right angle or a non-right angle in various examples. In the example shown in FIGS. 1-3, each node 28, 30 includes a one hollow arm 56 intersecting the hub 54 at a non-right angle and two hollow arms 56 intersecting the hub at right angles. In the example shown in FIG. 6, each node 28, 30 includes three hollow arms 56 each intersecting the hub 54 at a right angle.

As set forth above, the hollow arm 56 receives the frame rail 22. For example, the hollow arm 56 may telescopically receive the frame rail 22, as shown in the figures. As another example, the hollow arm 56 may be telescopically received by the frame rail 22. In one example, the front nodes 28 are welded to the middle section 16 and the front section 18 and the rear nodes 30 are welded to the middle section 16 and the rear section 20. For example, the hollow arm 56 may be welded to the frame rail 22. As another example, the front nodes 28 are fastened to the middle section 16 and the front section 18 and the rear nodes 30 are fastened to the middle section 16 and the rear section 20, e.g., with threaded fasteners such as bolts and weld nuts. For example, the hollow arm 56 may be fastened to the frame rail 22. As another example, the frame rail 22 may be connected to the hollow arm 56 by lugged-steel construction. In such an example, the frame rail 22 is press-fit into the hollow arm 56 and brazed to the inside of the walls of the hollow arm 56 with a heated, molten filler, e.g., silver, brass, etc., that is drawn between the frame rail and the hollow arm 56 by capillary action and hardened after cooling.

In some examples, including the example shown in the figures, the nodes 28, 30 include hollow arms 56 that are receive and are joined to one of the cross-beams 24. For example, cross-beams 24 of the middle section 16 are received by and joined to the hollow arms 56 of the nodes 28, 30 in the example in the figures.

The nodes 28, 30 provide a common interface for interchangeability of front sections 18 and interchangeability of rear sections 20. Specifically, front sections 18 having different designs, e.g., different powertrain compartments 42, different suspension and steering attachment points, etc., may all have a common interface for connection to the front nodes 28, allowing for any of the front sections 18 to be connected to the front nodes 28. Similarly, rear sections 20 having different designs may all have a common interface for connection to the rear nodes 30.

The front nodes 28 transfer energy from the front section 18 to the middle section 16 in the event of a vehicle impact at the front section 18, e.g., a vehicle-frontal impact. Similarly, the rear nodes 30 transfer energy from the rear section 20 to the middle section 16 in the event of a vehicle impact at the rear section 20, e.g., a vehicle-rear impact. Specifically, the nodes 28, 30 transmits force, i.e., creates a load path, from the front section 18/rear section 20 to middle section 16, specifically to the frame rails 22 of the middle section 16. The load paths created by the nodes 28, 30 direct force to the frame rails 22 to minimize or prevent force transmission to the electric-vehicle batteries 26

Specifically, in the event of a vehicle impact that creates axial force along the front section 18, e.g., a vehicle-frontal impact, or along the rear section 20, e.g., a rear impact, the nodes 28, 30 direct the axial force from the frame rails 22 of the front section 18/rear section 20 to the frame rails 22 of the middle section 16. This directs the force around the cross-beams 24 of the middle section 16 to minimize or prevent forces from the front section 18/rear section 20 from reaching the electric-vehicle batteries 26 in the cross-beams 24.

As set forth above, the middle section 16 of the vehicle frame 14 may include external battery compartments 34, i.e., battery compartments external to the cross-beams 24 and frame rails 22. In other words, the cross-beams 24 and the frame rails 22 define battery compartments therebetween. At least one of the electric-vehicle batteries 26 is in one of the external battery compartments 34. In such examples, the electric-vehicle batteries 26 in the internal battery compartments 32 may be and the electric-vehicle batteries 26 in the external battery compartments 34, in combination, electrify the powertrain of the vehicle as described above. In examples, in which the middle section 16 includes external battery compartments 34, a bottom panel 60 and a top panel 62 may be connected to the middle section 16 and sandwich the external battery compartments 34 therebetween to shield the external battery compartments 34 from the roadway and the passenger compartment. In the example shown in FIG. 8, the external battery compartment 34 is relatively large and supports a large battery array 64 for extended range travel of the electric vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
    a vehicle frame having a middle section, a front-section vehicle-forward of the middle section, and a rear section vehicle-rearward of the middle section;
    the middle section having frame rails spaced from each other and cross-beams extending from one frame rail to the other frame rail;
    one of the cross-beams defining an internal battery compartment within the one of the cross-beams;
    one or more electric-vehicle batteries, at least one of the electric-vehicle batteries being in the internal battery compartment of the one of the cross-beams; and
    two front nodes between and directly connected to the middle section and the front section and two rear nodes between and directly connected to the middle section and the rear section.

2. The assembly as set forth in claim 1, wherein one of the frame rails defines an internal battery compartment within the one of the frame rails, at least one of the electric-vehicle batteries is in the one of the frame rails.

3. The assembly as set forth in claim 1, wherein:
    each of a plurality of the cross-beams defines an internal battery compartment within the respective cross-beam;
    each of the plurality of the cross-beams has a base and a cover, the base having a U-shaped cross-section defining the internal battery compartment of the respective cross-beam and the cover being connected to the base enclosing the internal battery compartment of the respective cross-beam, at least one of the electric-vehicle batteries being in the internal battery compartments of the cross-beams.

4. The assembly as set forth in claim 3, wherein the cover is on a side of the cross-beam.

5. The assembly as set forth in claim 3, wherein one of the frame rails has a base and a cover, the base of the frame rail having a U-shaped cross-section defining an internal battery compartment and the cover of the frame rail being connected to the base of the frame rail enclosing the internal battery compartment of the frame rail.

6. The assembly as set forth in claim 5, wherein the internal battery compartments of at least some of the cross-beams are open to the internal battery compartment of the frame rail.

7. The assembly as set forth in claim 5, wherein the internal battery compartments of the cross-beams are elongated cross-vehicle and the internal battery compartment of the frame rail is elongated along a vehicle-longitudinal axis.

8. The assembly as set forth in claim 1, wherein the front nodes each include a hub joined to the middle section and front section and the rear nodes each include a hub joined to the middle section and the rear section.

9. The assembly as set forth in claim 8, wherein:
the front nodes each include a hollow arm extending from the hub of the front node and receiving and joined to the front section; and
the rear nodes each include a hollow arm extending from the hub of the rear node and receiving and joined to the rear section.

10. The assembly as set forth in claim 1, wherein one of the cross-beams extends from one of the front nodes to the other of the front nodes and another of the cross-beams extends from one of the rear nodes to the other of the rear nodes.

11. The assembly as set forth in claim 1, wherein the front nodes are on vehicle-forwardmost ends of the frame rails and the rear nodes are on vehicle-rearwardmost ends of the frame rails.

12. The assembly as set forth in claim 1, wherein the vehicle frame has a body-on-frame construction, the vehicle frame including cab mount brackets, and the vehicle including a vehicle body supported on and mounted to the cab mount brackets.

13. The assembly as set forth in claim 1, wherein the front nodes are welded to the middle section and the front section and the rear nodes are welded to the middle section and the rear section.

14. The assembly as set forth in claim 1, wherein the front nodes are fastened to the middle section and the front section and the rear nodes are fastened to the middle section and the rear section.

15. The assembly as set forth in claim 1, wherein the cross-beams and the frame rails define external battery compartments therebetween, at least one of the batteries being in one of the external battery compartments.

16. The assembly as set forth in claim 1, wherein the front section of the vehicle frame includes a vehicle powertrain cradle.

17. The assembly as set forth in claim 16, wherein the vehicle frame includes cab mount brackets, and the vehicle includes a vehicle body supported on and mounted to the vehicle frame.

18. The assembly as set forth in claim 1, wherein the cross-beams have a vehicle-longitudinal width and are spaced from each other by a vehicle-longitudinal spacing, the vehicle-longitudinal spacing being smaller than the vehicle-longitudinal width defined by the cross-beams.

19. The assembly as set forth in claim 2, wherein the internal battery compartment of the one of the frame rails is open to the internal battery compartment of the one of the cross-beams.

20. An assembly comprising:
a vehicle frame having a middle section, a front-section vehicle-forward of the middle section, and a rear section vehicle-rearward of the middle section;
the middle section having frame rails spaced from each other and cross-beams extending from one frame rail to the other frame rail;
one or more electric-vehicle batteries, at least one of the electric-vehicle batteries being in one of the cross-beams; and
two front nodes between and directly connected to the middle section and the front section and two rear nodes between and directly connected to the middle section and the rear section;
each of a plurality of the cross-beams having a base and a cover, the base having a U-shaped cross-section defining an internal battery compartment and the cover being connected to the base enclosing the internal battery compartment, at least one of the electric-vehicle batteries being in the internal battery compartments of the cross-beams;
one of the frame rails having a base and a cover, the base of the frame rail having a U-shaped cross-section defining an internal battery compartment and the cover of the frame rail being connected to the base of the frame rail enclosing the internal battery compartment of the frame rail; and
at least some of the internal battery compartments of the cross-beams being open to the internal battery compartment of the frame rail.

* * * * *

UNITED STATES PATENT AND TRADEMARK OFFICE
CERTIFICATE OF CORRECTION

| | |
|---|---|
| PATENT NO. | : 11,801,741 B2 |
| APPLICATION NO. | : 17/412582 |
| DATED | : October 31, 2023 |
| INVENTOR(S) | : Paul Zandbergen et al. |

It is certified that error appears in the above-identified patent and that said Letters Patent is hereby corrected as shown below:

In the Claims

Claim 3, Column 10, Line 50 replace "compartments" with "--compartment--"

Claim 4, Column 10, Line 53 replace "side of the cross-beams" with "--side of the respective cross-beams--"

Signed and Sealed this
Fifth Day of December, 2023

*Katherine Kelly Vidal*

Katherine Kelly Vidal
*Director of the United States Patent and Trademark Office*